Jan. 24, 1956  A. R. LINTERN  2,732,133
VEHICLE HEATING SYSTEM
Filed Aug. 20, 1951  2 Sheets-Sheet 1
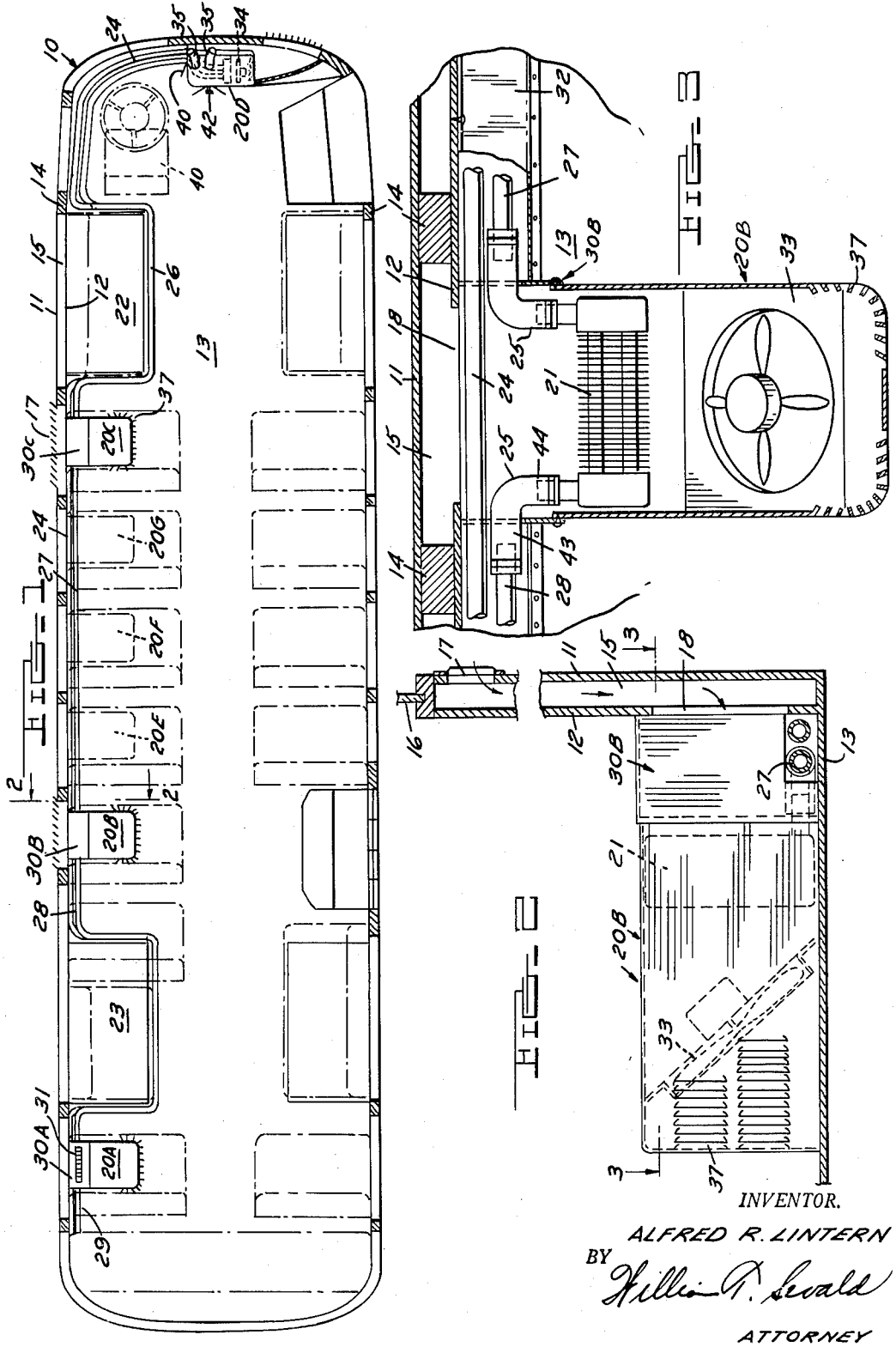
INVENTOR.
ALFRED R. LINTERN
BY
ATTORNEY Jan. 24, 1956     A. R. LINTERN     2,732,133
VEHICLE HEATING SYSTEM
Filed Aug. 20, 1951     2 Sheets-Sheet 2
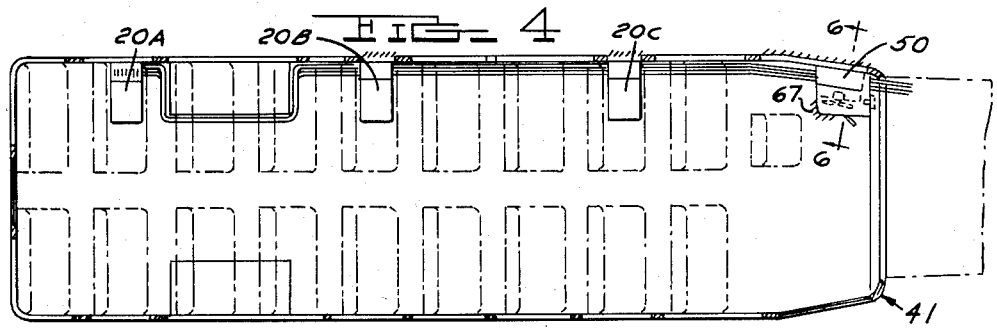
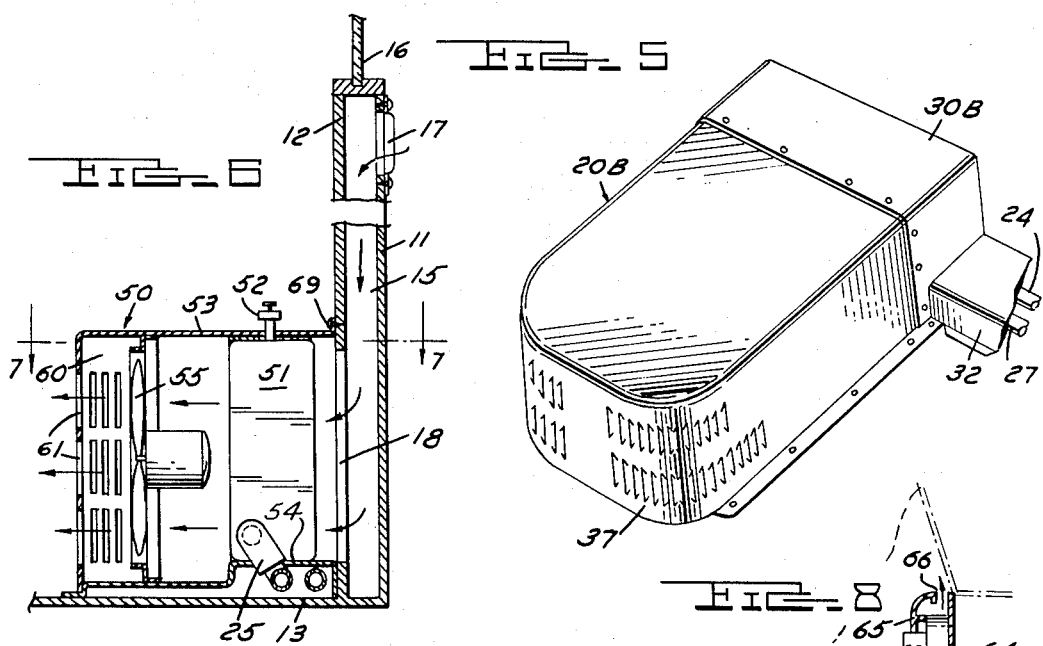
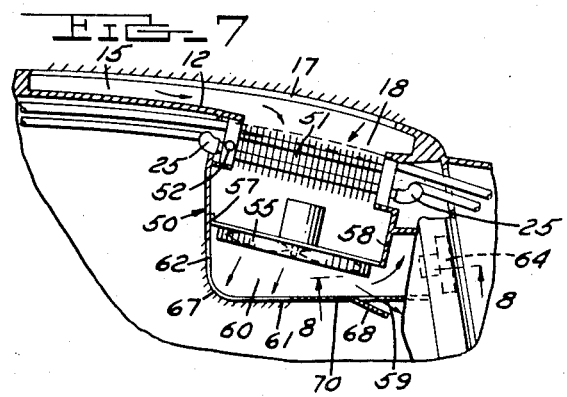
INVENTOR.
ALFRED R. LINTERN
BY
ATTORNEY

United States Patent Office 2,732,133
Patented Jan. 24, 1956

2,732,133

VEHICLE HEATING SYSTEM

Alfred R. Lintern, Detroit, Mich., assignor to A. R. Lintern, Inc., a corporation of Michigan Application August 20, 1951, Serial No. 242,658

2 Claims. (Cl. 237—12.3)

This invention generally relates to vehicle ventilating and heating systems and in particular to a combination fresh air and recirculated air system employing the same units with the system being capable of easy integration with an already manufactured and assembled vehicle such as a large transit bus or a school bus.

Due to the different sizes of passenger buses, which vary from 16 to 60 passengers, it has been heretofore impossible to use the same ventilating and heating units and systems on the various size buses to secure proper distribution and temperature without employing ducts and various sizes of motors, cores, fans, etc. With present day commercial equipment, the bus must be fitted with a system and units which are special for the size of the bus and the locality in which it is to be put into service as no universally adaptable system or units are available to suit and fulfill the exceedingly diverse requirements.

The various manufacturers of buses have concentrated their development efforts on having their buses perform satisfactorily under any conditions in relation to motors, brakes, bodies, etc. and have been so busy on overcoming the difficulties in this regard that they have practically ignored the ventilating and heating problem as witness the present day foul air, drafty, and inadequately heated buses in spite of the fact that the heat producing characteristics of the internal combustion engine is such that an adequate amount of air can be heated by the engine cooling medium through suitable transfer units so that an adequate amount of heated air can easily be furnished in conjunction with bus-motion and suitable fans.

Prior bus manufacturers have side-stepped the ventilating and heating problem for commercial reasons in that the profit on a bus, which is sold anyway, is their main interest and the expense of furnishing special heating and ventilating equipment would make their bus price-wise non-competitive to rival manufacturers.

It is, therefore, the primary object of the invention to provide universally adaptable units capable of elastic integration into a universally adaptable system for heating and ventilating any size bus for use in any locality with the units and system having air volume and heat intensity controls to enable the driver to readily regulate same for the changing weather conditions of the locality.

An object of the invention is to provide ventilating and heating units which will fit into all the various size buses of all the various manufacturers after or during their complete fabrication.

An object of the invention is to provide a unit optionally usable for fresh air or recirculating air heating.

An object of the invention is to provide standard attaching and integrating parts for uniting the units into a system.

An object of the invention is to provide universally usable units and parts for all bus manufacturers for use on all sizes of buses.

An object of the invention is to provide units and attaching parts which ordinary mechanics can install at the plants of the manufacturers according to supplied plans and specifications.

An object of the invention is to provide standard, inexpensive units and an elastic system capable of mass production and installation thereby obviating special plans, units, and specially trained installers.

An object of the invention is to provide a unit embodying an air take-off for defroster use.

These and other objects of the invention will become more apparent by reference to the following description of the inventive unit, parts, and system embodying the invention taken in connection with the accompanying drawings, in which:

Fig. 1 is a plan view of a large rear-engine, transit-bus body equipped with the invention units in the inventive combined fresh air and recirculated air ventilating and heating system.

Fig. 2 is a cross-sectional view of Fig. 1 taken on the line 2—2 thereof showing a unit in side elevation in conjunction with a bus side wall fresh air intake.

Fig. 3 is a cross-sectional view of Fig. 2 taken on the line 3—3 thereof.

Fig. 4 is a view similar to Fig. 1 showing a front engine school bus.

Fig. 5 is a perspective view of the heater disclosed in Figs. 2 and 3.

Fig. 6 is a cross-sectional view of the front unit of Fig. 4 taken on the line 6—6 thereof.

Fig. 7 is a cross-sectional view of Fig. 6 taken on the line 7—7 thereof; and

Fig. 8 is a cross-sectional view of Fig. 7 taken on the line 8—8 thereof.

Referring now to the drawings wherein like numerals refer to like and corresponding parts throughout the several views, the heater units and integrating system disclosed therein to illustrate the invention comprises a bus 10, an outside body wall 11, an inside body wall 12, a bus floor 13, body posts 14 separating and supporting the walls 11 and 12 and defining with the walls 11 and 12 and floor 13 inclosed ducts or chambers 15, side windows 16, air scooping louvers 17 in the outside wall 11 below the windows 16 at selected points adapted to deliver fresh air to the chambers 15, openings 18 in the inside wall 12 adjacent the floor 13 at selected points so as to cooperate with the louvers 17 to deliver air from the chamber 15 to the bus 10 interior, ventilating and heating units such as 20A, 20B, 20C, and 20D located in the bus interior on the floor 13 opposite the openings 18, heat exchanging cores 21 in the units 20, a bus front wheel housing 22, a bus rear wheel housing 23, a heating medium supply tube 24 leading from the vehicle engine circumventing the wheel housings 22 and 23 to the front unit 20D, an elbow 25 connecting the tube 24 to the core of unit 20D which is particularly described in my co-pending application Serial No. 233,307, filed June 25, 1951, a tube 26 leading from the core of unit 20D to the core of unit 20C, elbows 25 connecting the tube 26 to the cores of units 20C and 20D, a tube 27 leading from the core of unit 20C to the core of unit 20B, elbows 25 connecting the tube 27 to the cores of units 20C and 20B, a tube 28 leading from the core of unit 20B to the core of unit 20A, elbows 25 connecting the tube 28 to the cores of units 20B and 20A, a tube 29 leading from the core of unit 20A to the vehicle motor, an elbow 25 connecting the tube 29 to the core of unit 20A, saddles 30A, 30B, and 30C spanning the space between the units 20A, 20B, and 20C and the inside wall 12, and, in the instance of units 20B and 20C, covering the openings 18 adjacent thereto channeling the air coming therefrom to the intake side of the units 20B, and 20C, and in the instance of unit 20A filling the space between the unit 20A and the inside wall 12, inside air receiving apertures 31 in the saddle 30A for permitting air from the inside rear of the bus 10 to enter the unit 20A, and apron 32 covering the tubes 24, 26, 27, and 28 sealing the knocked-out portions of the saddles 30 over the tubes 24, 26, 27, and 28, fan assemblies 33 in the units 20A, B, and C adjacent the cores 21, a fan assembly 34 in the unit 20D, defroster ducts 35 leading from the unit 20D, and directional louvers 37 in the units 20A, 20B, and 20C discharging air into the interior of the bus 10.

More particularly, saddles 30A, 30B, and 30C differ only in that the saddle 30A has no wall opening 18 adjacent thereto and is equipped with intake louvers 31 for recirculating air in the rear of the bus 10 behind the rear wheel housings adjacent the vehicle motor exhaust so that no air contaminated by motor exhaust is introduced into the bus, whereas the saddles 30B and 30C are imperforate and enclose openings 18 for directing fresh air into the units 20B and C. The unit 20D differs from the units 20A, 20B, and 20C in that its cowl is hinged therewith for sealing the intake air portion of the unit 20D. It is to be also noted that the unit 20D in this instance must be located closer to the inside wall 12 than the other units 20 due to the location of the driver's seat 40 so that its cowl is sidewise positioned relative to the unit 20D and that the fan assembly 34 is not angularly inclined relative to the inside core whereas the fan assemblies 33 are angularly inclined relative to the floor 13 to lower the unit height so as to permit the location of the units 20A, 20B, and 20C beneath the vehicle seats.

In installing the inventive units and system in a bus, the only bus body modification required are easily formable openings in the outside wall 11 beneath the window 16 so as to avoid road dirt and exhaust fumes and gases adjacent the pavement over which openings the air scooping louvers 17 are placed and easily formable openings 18 in the inside wall 12 adjacent the floor 13 over which the saddles 30 are placed. The usual bus structure is utilized to form the chamber or channel 15. The louver 17 openings and the saddle openings 18 are formed in sets so as to cooperate with one another in introducing fresh air into the bus 10. The units 20A, 20B, and 20C are then positioned adjacent the openings 18 in spaced relation thereto to permit easy heat connections except that no opening is provided at the unit 20A and the unit 20D is positioned with its hinged cowl over the openings adjacent thereto. The tubes 24, 26, 27, and 28 are then connected to the units 21 via like elbows 25. The saddles 30A, 30B, and 30C are then positioned intermediate the units 20A, 20B, and 20C and the inside wall 12, and the aprons 32 are then positioned over the tubes 24, 26, 27 and 28 which are connected to the vehicle motor cooling system by conventional means.

The ease of installation is facilitated by the standard parts of the units tubes, louvers, saddles, aprons, and elbows and permits the ordinary mechanic to make proper installation.

The elasticity of the system is easily seen in that additional units 20E, 20F, and 20G or more, shown in dotted lines, Fig. 1, may be installed in the bus as desired. Obviously fewer units can be installed on both sides of the bus under every seat except at the wheelhouses.

The unit 20D differs from the units 20A, 20B, and 20C due to the very different space and functional requirements in the front end of the bus 10. The unit 20D must be much shorter to fit in the available space and must also provide air for defrosting the windshield and it is desirable to provide a door 40 for specially directing air adjacent the driver's feet.

A front engined school bus 41 installation is shown in Fig. 4 with like units 20A, 20B, and 20C, similarly installed using the identical parts and installation technique described in connection with the large transit bus 10 except as to front unit 50 which has its saddle and defroster take-off formed integral therewith as hereinafter more fully described and it is obvious that any type or size bus can be easily equipped with the inventive units and system using as many units as desired based on the size of the bus and the desired amount of optionally heated fresh air desired per passenger per minute.

A suitable heating medium flow control valve is located in the system such as the valve 42 in the unit 20D, Fig. 1, and the valve 51 in the unit 50, Figs. 6 and 7, where it is convenient for driver operation, and, fan motor switches, not shown, are also conveniently located to the driver for controlling the speed of the fans.

It is important to note that the elbows 25 are preferably made of rubber or similar material so as to be flexible and that the elbow has a long arm 43 and a short arm 44 facilitating short or long connections by reversing the position of the arms, such as seen in the various figures, and, it is to be noted that no intricate bending of the tubes is required in employing the elbows 25.

The front unit 50, Figs. 4, 6, 7, and 8, especially for front engined buses, comprises a core 51 positioned over an opening 18 connected in series with the other units in the bus via suitable hoses and elbows 25, a heating medium shutoff and throttle valve 52 is located on one side of the core 51 for regulating the flow in the system, an angulated, wall-hugging cowl 53 sealably fitting over the wall opening 18 and the core 51, a false-bottom 54 in the unit 50 sealably connecting with the core 51, with the opening 18, and with the cowl 53 so that the heating medium supply and return tubes are provided with a channel for running therebeneath, a fan 55 located adjacent the core 51 in parallel relation to the core 51 and in oblique relationship to the cowl 53, a shroud 56 surrounding the fan 55 abutting the cowl 53 on one side 57 and located in spaced relationship at the other side 58 so as to provide an air passage between the fan shroud point 58 and the cowl portion at 59, a plenum chamber 60 between the fan 55 and the front portion 61 and the side portion 62 of the cowl 53, an air defroster stack 63 communicating with the plenum chamber 60 via the passageway between the point 58 on the fan shroud and the point 59 on the cowl, a blower 64 at the top of the stack 63, a defroster distribution duct 65 coextensive with the bottom of the windshield having a vent 66 coextensive with the bottom of the windshield for distributing air over the whole windshield area, directional louvers 67 in the front 61 and side 62 of the cowl 53, and a driver foot-heating door 68 in the cowl 53 at a point located on the cowl 59 opposite the fan cowl point 58 with the door 68 being optionally and adjustably openable and closeable.

The unit 50 does not employ a saddle such as units 20A, 20B, and 20C because of the space limitation between the wall and driver's feet and the foot controls of the front-engine bus. It will, therefore, be noted that the tubes and elbows 25 can be connected to the core before the unit 50 is screwed to the wall as at 69; after the connections are made, the unit is placed over the opening 18 and secured to the inside wall 12. This manner of connection is permitted by the arcuate conformation of the vehicle body at this point so that when the unit 15 is pulled inwardly from the wall slack is furnished in the tubes; whereas when the unit 50 is finally placed against the wall the slack is eliminated.

Air is introduced to the unit 50 via the air scooping louvers 17, the channel 15, and the opening 18 whereby the fresh air from outside of the bus is introduced to the interior of the bus via the core 51 providing optionally heating the air. The fan 55 augments the flow of air and directs same under pressure into the plenum chamber 60 whereby the air is released via the directional vents 67 from the left hand side of the fan as seen in Fig. 7 with the right hand side of the fan being blocked by the imperforate portion 70 of the cowl 53 adjacent the driver foot-heating door 68 and the defroster air passageway; in the event the driver wishes heating adjacent his feet he opens the door 68 to the desired position. In the event a foggy windshield condition exists, the driver runs the blower 64 which drags heated fresh air from the right side of the fan as seen in Fig. 7, exclusively if the door 68 is closed, and mixed with interior bus air if the door 68 is open; in this way the driver regulates the temperature of the air in the defroster system. Under normal conditions, in the embodiment including Figure 7, it can be seen that the driver foot door 68 can be employed exclusively, if desired, to regulate the amount of heated fresh air or recirculated air to the defroster system as the directional vents or louvers 67 normally adequately heat the driver area.

It is important to note that the elbows 25 facilitate the easy integration of the units into a system in conjunction with the saddles 30 so that an ordinary mechanic can easily integrate any number of heating units into a bus interior. In this connection the louver assembly 17, saddles 30, and elbows 25 facilitate the easy installation which is elastic and adjustable to any weather conditions.

In operation, the cooling medium of the vehicle engine is circulated through the cores via the tubes of the system and, the motor heating the water of the system supplies heat in excess of requirements due to the great heat loss characteristics of the internal combustion engine used to power the bus. Air is introduced into the bus interior by the air scooping louvers 17 via the chambers 15, openings 18, saddles 30 and unit directional louvers 37 flowing through the cores 21 and augmented by the fan assemblies 33 when the bus is in motion and delivered entirely by the fan assemblies 33 when the bus is standing, with the unit 20A in the rear of the bus recirculating the surrounding air so as to avoid introducing motor exhaust contamination.

The introduction of fresh air, optionally heated, into the bus in large volume raises the pressure of the interior of the vehicle above the atmospheric pressure outside the vehicle so that all flow of air in bus cracks, openings fissures, and crevices if from a direction from the inside of the vehicle to the outside of the vehicle thereby eliminating inward flow of air which eliminates drafts in the bus.

The general proportions in relationship in the units, saddles, elbows, tubing and louvers indicated in the drawings and described herein are desirable and essential to the proper installation and functioning of the inventive units and system and although the invention has been disclosed and described as a bus ventilating and heating system, it may obviously be used in other vehicles such as passenger cars, trucks, and railway coaches.

Although the inventive system has been disclosed and described in conjunction with particular units, it is obvious that many changes may be made in the size, shape, detail and arrangements of the elements of the invention within the scope of the appended claims.

I claim:

1. In a vehicle fresh-air ventilating and heating system a rearmost unit located to the rear of the rear wheel houses of the vehicle and spaced from a blank inside wall of the vehicle, a foremost unit located adjacent the driver, an integral cover on said foremost unit sealably connecting the foremost unit to the side wall, a false bottom in said foremost unit sealably connected to the side wall, intermediate units located on the floor of the vehicle and in spaced relation to the inside wall, heating medium supply and return tubes connecting all said units in series with the cooling system of the vehicle engine and connected to said rearmost unit and intermediate unit in the space between said units and the inside wall of the vehicle and to said foremost unit via the space provided by said false bottom, auxiliary saddles sealably connecting the intake side of said units with the inside wall of the vehicle and providing a cover extending from said units over said tubes, said rearmost unit saddle having apertures for receiving air to permit the air in the rear of the vehicle to enter the intake side of said rearmost unit, the inside wall of the bus having apertures within the saddles of said foremost and intermediate units, said apertures communicating with a space between the inside and outside walls of the vehicle between the vehicle body posts, air scooping louvers in the vehicle outside wall preferably adjacent the vehicle side windows and correspondingly located relative to the openings in the vehicle inside wall so that air entering said louvers travels to the intake side of said foremost and intermediate units via the space between the vehicle walls and posts, the openings in the inside wall and said saddles being disposed so that, when the vehicle is in motion, air under pressure is supplied to said foremost and intermediate units, said units being equipped with directional louvers on their exhaust sides for venting air to the vehicle interior from said units.

2. In a system as set forth in claim 1, fan assemblies in said units adapted to augment the supply of air to the vehicle interior and speed selective switches controlling said fans and a heating medium flow control valve in said system.

References Cited in the file of this patent

UNITED STATES PATENTS

| | | |
|---|---|---|
| 1,637,341 | Holan | Aug. 2, 1927 |
| 1,720,858 | Rombauer | July 16, 1929 |
| 1,939,916 | Otto | Dec. 19, 1933 |
| 2,130,686 | Kateley | Sept. 20, 1938 |
| 2,179,873 | Anderson | Nov. 14, 1939 |
| 2,201,916 | Parsons | May 21, 1940 |
| 2,286,749 | McElgin | June 16, 1942 |
| 2,476,295 | Hans | July 19, 1949 |
| 2,586,689 | Mieras | Feb. 19, 1952 |